(No Model.)
H. P. HULL.
FORK.
No. 500,207. Patented June 27, 1893.
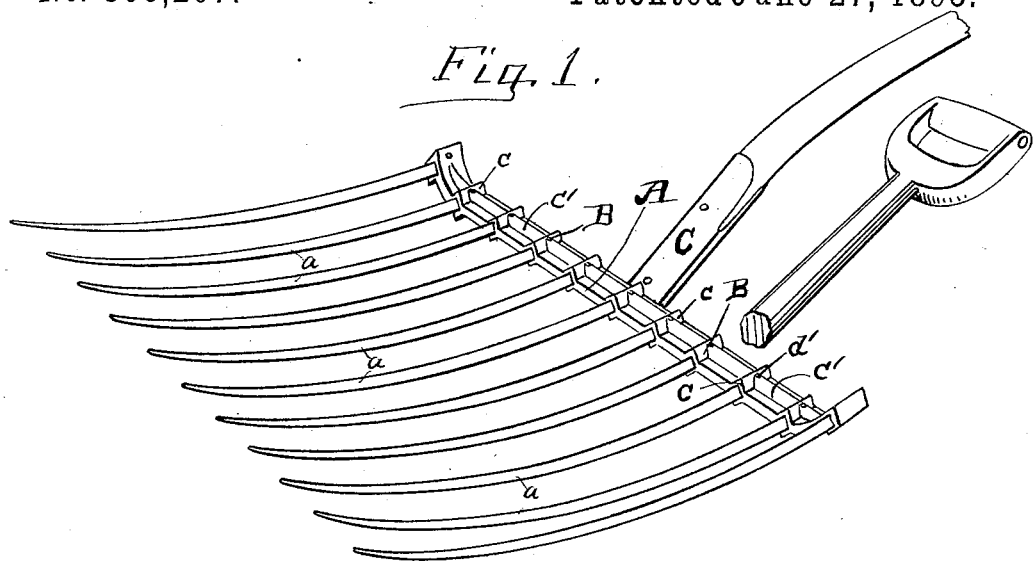
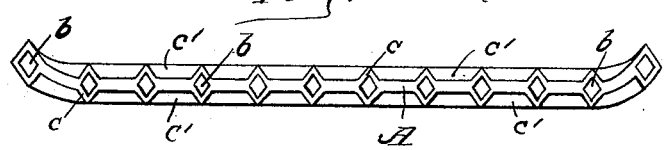
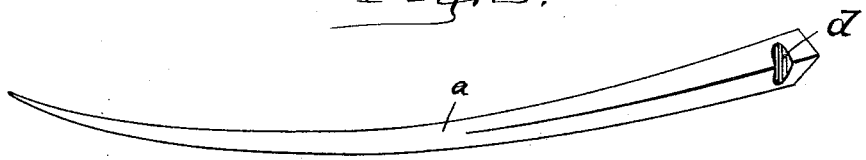
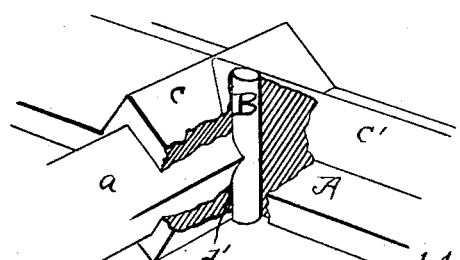
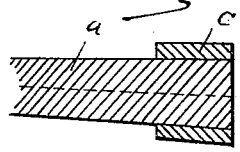
Witnesses
O. J. Cross
Laura Shaeffer
Inventor
Henry P. Hull
By Fred W. Bond
His Attorney

UNITED STATES PATENT OFFICE.

HENRY P. HULL, OF CANTON, OHIO.

FORK.

SPECIFICATION forming part of Letters Patent No. 500,207, dated June 27, 1893.

Application filed October 6, 1892. Serial No. 448,013. (No model.)

*To all whom it may concern:*

Be it known that I, HENRY P. HULL, a citizen of the United States, residing at Canton, in the county of Stark and State of Ohio, have invented certain new and useful Improvements in Forks; and I do hereby declare that the following is a full, clear, and exact description of the same, reference being had to the annexed drawings, making a part of this specification, and to the letters of reference marked thereon, in which—

Figure 1 is a perspective view of the fork. Fig. 2, is a detached view of the fork-head, showing the tines removed therefrom. Fig. 3, is a detached view of one of the tines. Fig. 4, is a detached view showing a portion of the fork-head, and illustrating the manner of locking the tines to said fork-head. Fig. 5, is a transverse section of the fork-head showing the taper of the tine apertures.

The present invention has relation to forks; and it consists in the novel construction and arrangement hereinafter described and particularly pointed out in the claims.

Similar letters of reference indicate corresponding parts in all the figures of the drawings.

In the accompanying drawings A, represents the fork-head, which is substantially of the form shown in the drawings, and as shown, it is provided with tine apertures which are for the purpose of receiving the tines $a$. The fork head A, is formed of a single piece of metal, and is provided with the tine apertures $b$, said apertures being formed by means of the ridges $c$, which ridges extend above and below the body of the fork-head substantially as illustrated in Fig. 2. The object and purpose of forming the ridges $c$, is to provide an aperture of sufficient size to receive the tine without increasing the thickness of the fork-head A. For the purpose of strengthening the fork-head A, the longitudinal-rib $c$, is formed, which is located upon the top or upper side of the fork-head A, and is formed integral with it; said rib intersecting the ridges formed above the tine apertures $b$. For the purpose of providing a fork capable of handling coke, coal, and the like material, the ends of the head A, are bent or curved upward; and said bent or curved portion provided with tine apertures which are to receive the outer tines of the fork, and thereby elevate said outer tines above the inner tines, substantially as illustrated in Fig. 1.

For the purpose of providing a means for securely holding the tines in proper position the locking-pins B, are provided which locking-pins extend vertically through the fork-head A, and intersect the notches $d$, formed in the tines $a$.

For the purpose of securely seating the tines $a$, in the apertures $b$, said tines and apertures are formed somewhat tapering; the taper of the apertures corresponds with the taper of the tines.

In the drawings, but one of the longitudinal ribs $c'$, is shown; but it will be understood that two or more ribs may be formed upon the top or upper side of the fork-head if desired, and a ridge or ridges may be formed upon the bottom or under side of the fork-head. It will be understood that by forming the longitudinal rib or ribs $c'$, they will intersect the ribs $c$, at the point or points where the apertures $d'$, are to be made to receive the locking-pin B, thereby providing a better starting point for the drill.

The handle-socket C, is formed in two pieces or halves, and the pieces and halves united together at their front or forward ends. I prefer to form the handle socket C, integral with the fork-head A; but it will be understood that the handle socket C, may be formed separate from the head, and attached in any convenient and well known manner. The object and purpose of forming the handle-socket C, of two pieces or halves is to provide a means for adjusting the said handle socket to different sized handles. It will be understood that the ribs $c'$, may be located upon either side of the head A, and the same object accomplished, and in use, the ribs $c'$ may be simply extended a short distance from the sides of the cross-ribs $c$.

Having fully described my invention, what I claim as new, and desire to secure by Letters Patent, is—

1. The combination of the fork-head A, provided with the tine-apertures $b$, the cross ridges $c$, the longitudinal rib $c'$, intersecting the cross ridges, the tines $a$, provided with the notches $d$, and the locking pins B, substantially as and for the purpose specified.

2. The combination of the fork-head A, provided with tine apertures, and bent or curved upward at its ends, the cross ridges $c$, the longitudinal ridges or ribs $c'$, the tines $a$, provided with the notches $d$, the locking-pin B, and the handle socket C, formed in sections substantially as and for the purpose specified.

In testimony that I claim the above I have hereunto subscribed my name in the presence of two witnesses.

HENRY P. HULL.

Witnesses:
F. W. BOND,
CHAS. M. STANDS.